(12) United States Patent
Kawano et al.

(10) Patent No.: US 6,669,590 B2
(45) Date of Patent: Dec. 30, 2003

(54) PLASTIC MOVABLE GUIDE FOR TRANSMISSION DEVICE

(75) Inventors: Atsushi Kawano, Osaka (JP); Junya Kurohata, Osaka (JP); Tatsuya Konishi, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/263,524

(22) Filed: Oct. 3, 2002

(65) Prior Publication Data

US 2003/0078121 A1 Apr. 24, 2003

(30) Foreign Application Priority Data

Oct. 23, 2001 (JP) ......................... 2001-325528

(51) Int. Cl.⁷ ................................. F16H 7/18
(52) U.S. Cl. ....................... 474/140; 474/111
(58) Field of Search ................. 474/111, 140, 474/144, 145, 146, 147

(56) References Cited

U.S. PATENT DOCUMENTS 4,826,468 A * 5/1989 Friedrichs ............... 474/101
5,820,502 A * 10/1998 Schulze ................. 474/140
6,036,613 A * 3/2000 Diehm ................... 474/111
2002/0077204 A1  6/2002 Kumakura

FOREIGN PATENT DOCUMENTS

| EP | 0 195 945 A1 | * 10/1986 | .............. 474/111 |
| FR | 827.707 | * 5/1938 | .............. 474/111 |
| GB | 2 254 904 A | * 10/1992 | .............. 474/111 |
| JP | 52-1316 | * 1/1977 | .............. 474/111 |
| JP | 3253951 B1 | 11/2001 | |

* cited by examiner

Primary Examiner—Stephen M. Johnson
(74) Attorney, Agent, or Firm—Howson and Howson

(57) ABSTRACT

A plastic movable guide for a belt or chain transmission has a plunger-engaging portion for contact with the plunger of a tensioner at a location remote from its pivot axis. A reinforcing plate is located in a slot in a resin guide body, and is slightly recessed at the location of the plunger-engaging portion so that it does not protrude from the slot opening and is not contacted by the plunger of the tensioner. Superior quietness of operation, ease of assembly, and reduction of production cost are achieved.

3 Claims, 6 Drawing Sheets

PLASTIC MOVABLE GUIDE FOR TRANSMISSION DEVICE

FIELD OF THE INVENTION

This invention relates to a plastic movable guide for an endless, flexible, circulating power transmission medium, such as a chain in a chain and sprocket transmission, or a belt in a belt and pulley transmission.

BACKGROUND OF THE INVENTION

Many machines, such as automobile engines, include a transmission device, which transmits power by means of a chain, a belt or the like. A movable guide is maintained in sliding contact with the transmission medium, and cooperates with a tensioner to maintain tension and to prevent vibration of the medium in its plane of travel and also to prevent transverse vibration. A movable guide is typically pivotally mounted on the frame of the engine or other machine by a shaft such as a bolt or a pin.

FIGS. 8 and 9 show a plastic movable guide 300 used as a tensioner lever in a chain transmission disclosed in Japanese Patent Application No. 2000-382798. This plastic movable guide 300 comprises a guide body 301, including an elongated shoe 302 having a front surface for sliding contact with a traveling chain, belt or the like, and a plate-receiving portion 303 extending longitudinally on the back of he shoe 302. The shoe and plate-receiving portion are integrally molded as a unit from a synthetic resin. A reinforcing plate 308, made of a rigid material, for reinforcing the guide body 301, fits into a longitudinally extending slot 307, which opens at the edge of the plate-receiving portion 303, the opening facing in a direction opposite to the direction in which the front surface of the shoe faces. At one end of the plate-receiving portion 303, a mounting hole 305 is provided for mounting the guide body on the frame of an engine or other machine. A through hole 308A is provided at one end of the reinforcing plate 308. When the reinforcing plate and guide body are assembled together with the reinforcing plate fitting into slot 307, the through hole 308A and the mounting hole 305 are in register with each other, and receive a mounting bolt, pin or the like.

Because the plate-receiving portion 303 and the shoe 302 are integrally molded of synthetic resin, the guide body itself presents a surface for sliding contact with the flexible transmission medium, and it not necessary to provide a separate shoe. Consequently, the number of parts, and the number of steps needed to fabricate the guide, are reduced. Since a longitudinal slot 307, opening at the edge of the plate-receiving portion 303 receives a reinforcing plate 308, the rigidity, toughness, strength of the plastic movable guide, and especially the rigidity of the guide against bending in the plane of pivoting movement, are significantly improved.

In the conventional plastic movable guide 300, the relationships between the respective sizes and shapes of the guide body 301 and the reinforcing plate 308 have not been considered important, and, in practice, the size and shape of the reinforcing plate 308 have been designed to be the same as the size and shape of the slot in the guide body 301. However, variations in production accuracy and differences between coefficients of thermal expansion of materials cause the end of the reinforcing plate to protrude slightly from the guide body.

The above-described plastic movable guide produces more noise than a plastic movable guide composed only of resin material.

A reinforcing plate made of a rigid material such as metal wears more readily than the resin forming the guide body. Thus, it is necessary to subject the reinforcing plate to a preliminary strengthening process such as heat treatment to enhance its wear resistance. The preliminary treatment of the reinforcing plate increases the production cost of the guide. The preliminary treatment also causes distortion of the reinforcing plate, resulting in difficulties in fitting the reinforcing plate into the slot of the guide body.

The inventors have studied and analyzed the cause of noise in plastic movable guides, and the cause of wear of the reinforcing plate, and have found unexpectedly that the above-mentioned problems do not occur in all plastic movable guides, but only in guides in which an end of the reinforcing portion protrudes from the slot of the guide body. They found that direct contact between a plunger of the tensioner and the reinforcing plate causes the generation of noise in the conventional plastic movable guide, and also causes the reinforcing plate to wear earlier than the guide body.

SUMMARY OF THE INVENTION

Accordingly, among the objects of the invention are the solution of the above-mentioned problems of prior art plastic movable guides and the provision of a plastic movable guide having superior quietness of operation, easy assembly and reduced production cost.

The plastic movable guide in accordance with the invention comprises an elongated guide body and a reinforcing plate. The guide body is composed of an elongated shoe having a front surface for sliding contact with the power transmission medium and a back side, and a plate-receiving portion extending longitudinally along the back side of said shoe and having a longitudinally extending slot having an opening facing in a direction opposite to the direction in which the front surface of the shoe faces. The shoe and plate-receiving portion are integrally molded as a unit from a synthetic resin. The reinforcing plate fits into the slot, and the guide body and reinforcing plate are pivotable about a mounting located adjacent one end of the guide body. A part of the plate-receiving portion, remote from the pivoting end of the guide body, forms a plunger-engaging surface, engageable with the plunger of a tensioner. The plunger-engaging surface is divided by the opening of the slot, and the reinforcing plate is recessed in the slot, at least at the location at which the slot divides the plunger-engaging surface, so that the reinforcing plate does not protrude from the part of the opening of the slot that divides the plunger-engaging surface.

Preferably a mounting hole for mounting the guide is provided adjacent said one end of the guide body, and a through hole is provided adjacent an end of the reinforcing plate. These through holes are in register with each other when the reinforcing plate is located in said slot so that the reinforcing plate and the guide body may be held together by, and pivoted on, a shaft extending through the mounting holes.

The plastic material forming a guide body is not especially limited. However, since the sliding contact surface of the guide body functions as a shoe, the material is preferably a so-called "engineering plastic," such as a polyamide resin, having excellent wear resistance and lubricating properties. A fiber-reinforced resin may be used either with or without a non-reinforced resin. The material of the reinforcing plate is not especially limited but should be selected so that the reinforcing plate has the bending rigidity and strength required for a plastic movable guide. Iron based metals, nonferrous metals such as aluminum, magnesium, titanium and the like, engineering plastics such as polyamide resin and the like, or fiber reinforced plastics are preferably used.

The following unique effects are obtained by a plastic movable guide having the above structure.

The plunger of the tensioner is engaged by a large area of the guide body, and therefore the contact area between the movable guide and the plunger is much greater than in the case where the plunger and the reinforcing plate directly contact each other. Accordingly the contact pressure is reduced, which results in decreased wear of the reinforcing plate at the location of the plunger-engaging portion of the guide body. Since the tensioner plunger engages only the plastic material of the guide body, no metallic noise is generated. Moreover, the plastic material of the guide body also absorbs vibrations better than in the case where the plunger and the reinforcing plate contact each other directly. Thus, the plastic movable guide in accordance with the invention pivots quietly, imparting appropriate tension to a chain, a belt or the like, and also reliably prevents vibration of the chain, belt or the like, including both vibrations in the plane of circulation, and transverse vibrations.

Because the guide body and reinforcing plate are held together by a mounting shaft that extends through mounting holes in both elements, the guide body and the reinforcing plate can pivot about the mounting shaft in cooperation with each other, without the reinforcing plate becoming disconnected from the guide body. Even if there is a difference between the coefficients of thermal expansion of the reinforcing plate and the guide body, the reinforcing plate and guide body are secured together at one end and are free to expand and retract longitudinally relative to each other so that deformation and breakage due to thermal effects are avoided.

DETAILED DESCRIPTION OF THE PREFERRED EMBODIMENTS

Figure 1:
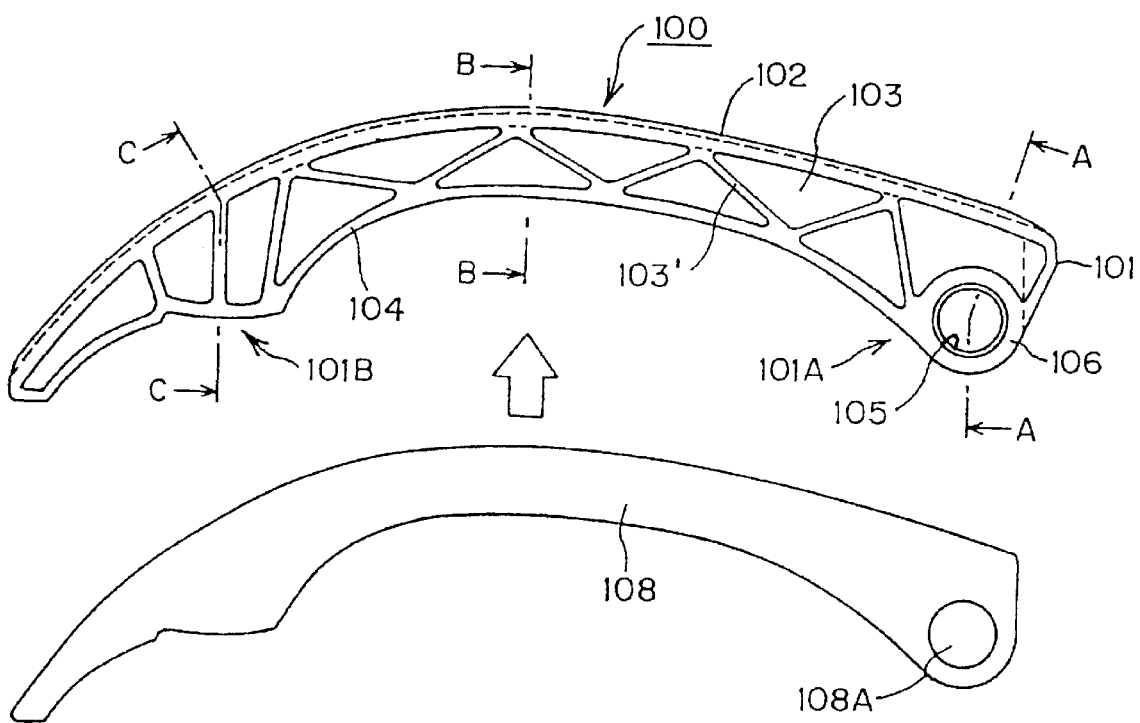
FIG. 1 is an exploded view of a movable according to a first embodiment of the invention.
Figure 2:
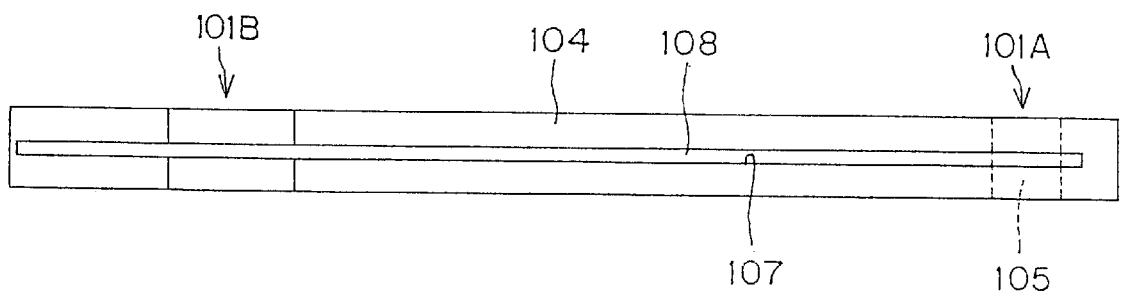
FIG. 2 is an elevational view of a surface of the guide body, as seen from the bottom of FIG. 1.

A first embodiment of the invention will be described with reference to FIGS. 1 to 5. In FIG. 1, a plastic movable guide 100, used in a chain transmission is formed by inserting a reinforcing plate 108 into a guide body 101 in the direction of the arrow. The guide body 100 is integrally molded as a unit from a synthetic resin, and comprises a shoe portion 102 having, on its front side, a sliding contact surface on which a chain travels, and on its opposite side, a plate-receiving portion 103, extending longitudinally along the guide. A flange 104 is formed along the edge of the plate-receiving portion 103 remote from the shoe. The guide body 100 further includes a boss 106 having a mounting hole 105. The plate-receiving portion 103 has a truss-shaped arrangement of reinforcing ribs 103', and a longitudinally extending slot 107, opening in the flange 104 and facing in the direction opposite to the direction in which the chain-contacting surface of the shoe faces.

To reinforce the guide body 101, a reinforcing plate 108, having a through hole 108A for a mounting shaft such as a bolt or pin, fits into slot 107 from the side opposite to the side having the shoe 102.

Figure 5:
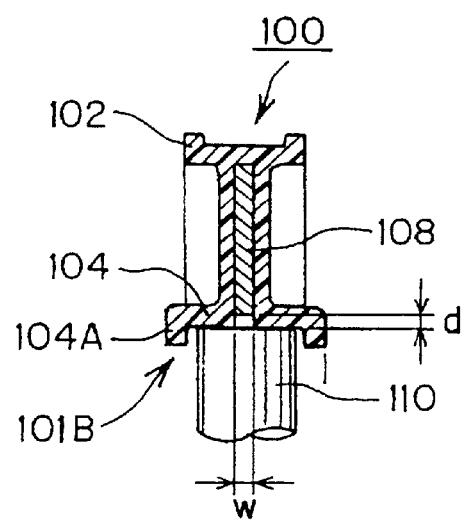
FIG. 5 is a cross-sectional view taken on plane C—C in FIG. 1, and also showing a plunger contacting a plunger-receiving portion on the guide.

A plunger engaging portion 101B is formed on the plate-receiving portion of the guide body near the end opposite the end at which the mounting hole 105 is located. The surface of the plunger-engaging portion is divided by the slot into two parts, which are engageable by the plunger of a tensioner to control pivoting movement of the guide. As shown in FIG. 5, in the plunger engaging portion 101B, the reinforcing plate 108 is slightly recessed, and does not protrude beyond the slot opening. The term "slightly recessed" means that the reinforcing plate is recessed to a degree such that the plunger can be reliably engaged with the plunger engaging portion 101B during pivoting movement of the guide, without the head of the plunger coming into contact with the reinforcing plate. The depth to which the edge of the reinforcing plate is recessed below the plunger engaging surface is not necessarily limited. However, it is preferred that the depth of the recess be not more than the width of the slot. That is, the depth d to which the plate is recessed should be related to the slot width w so that the ratio d/w, as depicted in FIG. 5, is 1 or less.

The shape of the plunger-engaging portion 101B is not limited especially. Nevertheless, it is desirable to provide protrusions 104A, as shown in FIG. 5, along both edges of the flange to prevent lateral shift of the guide relative to the plunger, which could result in dislodging of the plunger from the plunger-engaging portion 101B.

In this embodiment, the reinforcing plate is recessed in only at the location of the plunger-engaging portion 101B. However, the reinforcing plate 108 may be recessed along the entire length of the movable guide.

Figure 3:
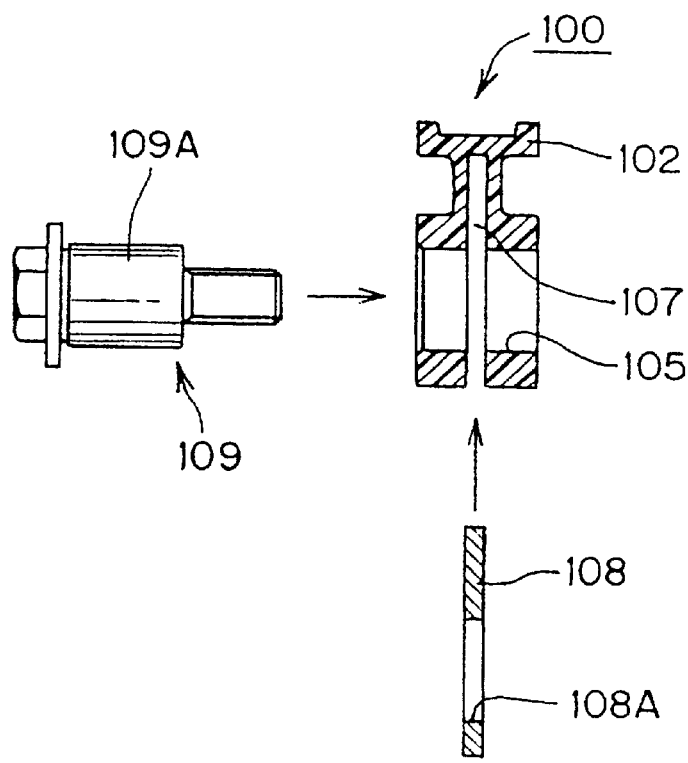
FIG. 3 is a cross-sectional view taken on plane A—A in FIG. 1.
Figure 4:
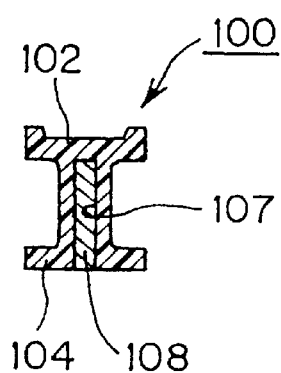
FIG. 4 is a cross-sectional view taken on plane B—B in FIG. 1.

The plastic movable guide having a reinforcing plate 108 fitting into its slot, is mounted on a frame of a machine such as an engine by fastening the guide body 101 and the reinforcing plate 108 together on mounting bolt, such as shoulder bolt 109, as shown in FIG. 3. The shoulder bolt 109 has a pivot support portion 109A.

Even if there is a difference between the coefficients of the thermal expansion of the guide body 101 and the reinforcing plate 108, the reinforcing plate 108 is held in the guide body by engagement of its through hole 108A with mounting bolt 109 or a mounting pin. Thus, the guide body and the reinforcing plate are free to move relative to each other in the longitudinal direction so that deformation and breakage are avoided. However, the engagement of the straight edge portion near the end of the reinforcing plate 108 with the wall of the slot 107 when the plate is fitted into the slot, prevents the reinforcing plate from pivoting relative to the guide body, and thereby maintains the recessed relationship between the plate and guide body at the location of the plunger-engaging portion 101B.

Figure 6:
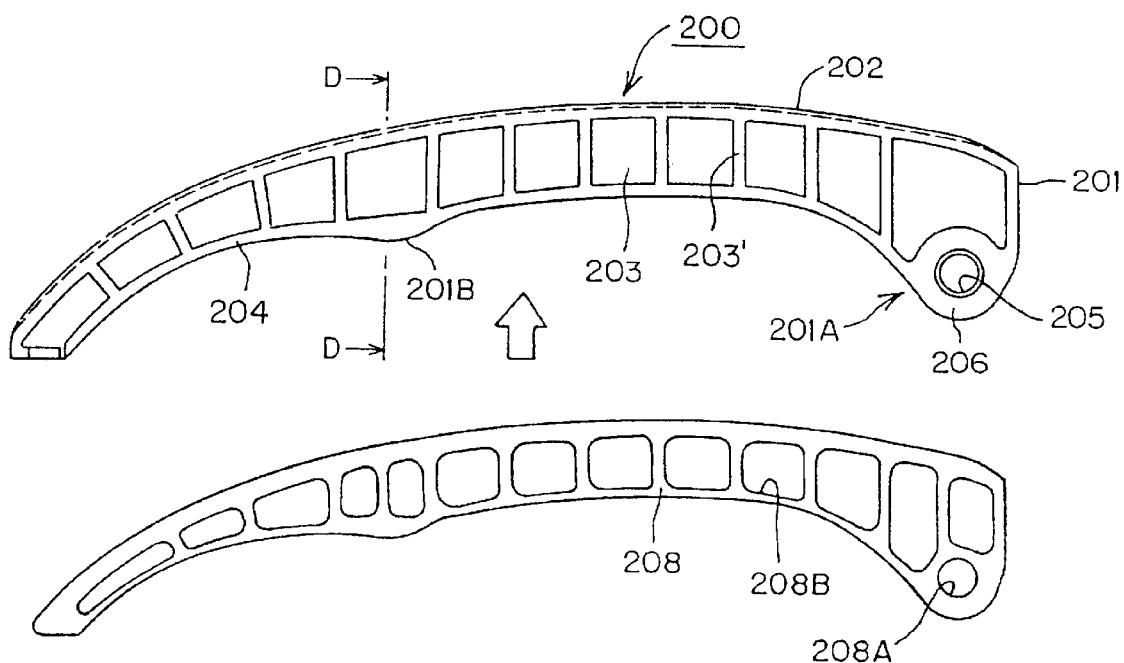
FIG. 6 is an exploded view of a movable guide according to a second embodiment of the invention, FIG. 7($a$) is a cross-sectional view taken on plane D—D in FIG. 6.
Figure 7A:
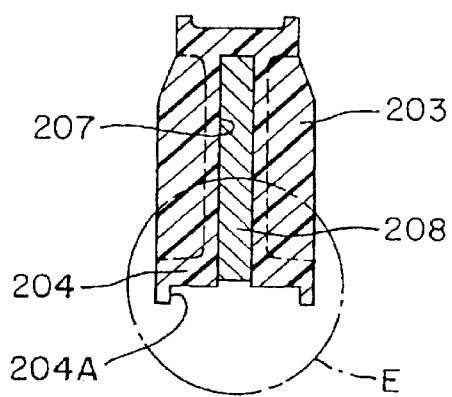
FIG. 7($b$) is an enlarged view a portion labeled "E" in FIG. 7($a$)
Figure 7B:
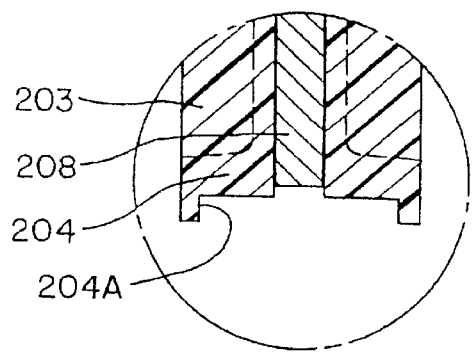
Figure 8:
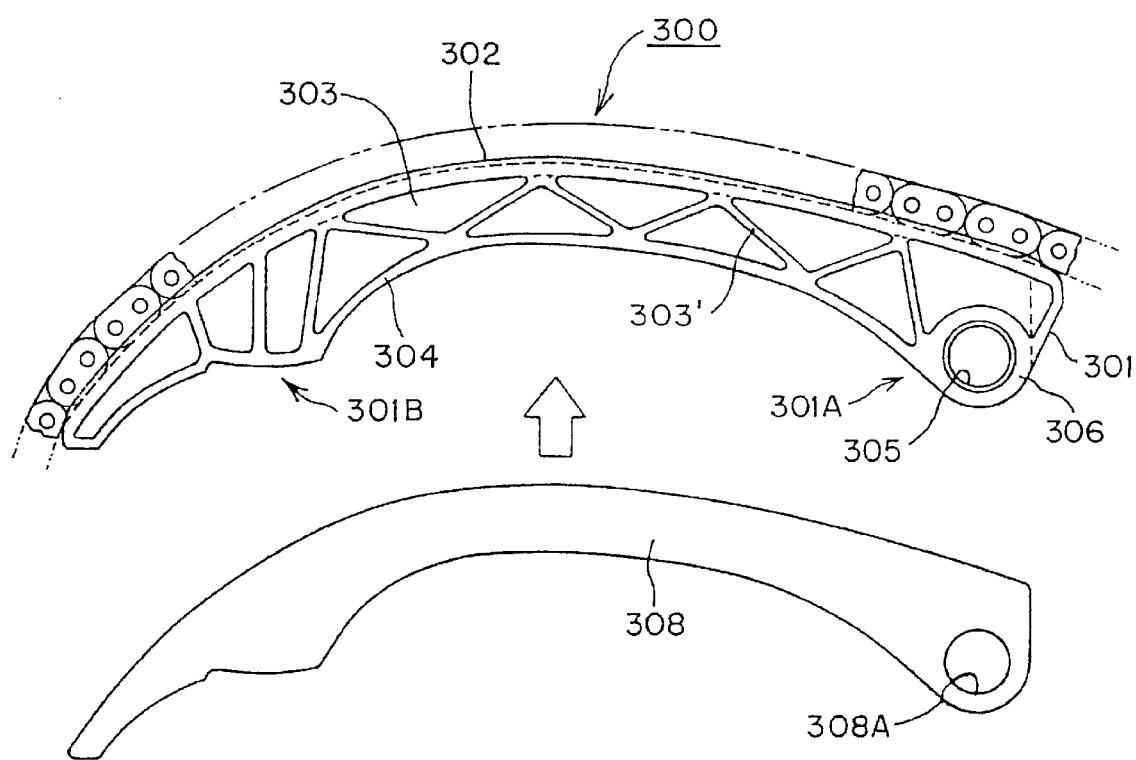
FIG. 8 is an exploded view of a conventional movable guide.
Figure 9:
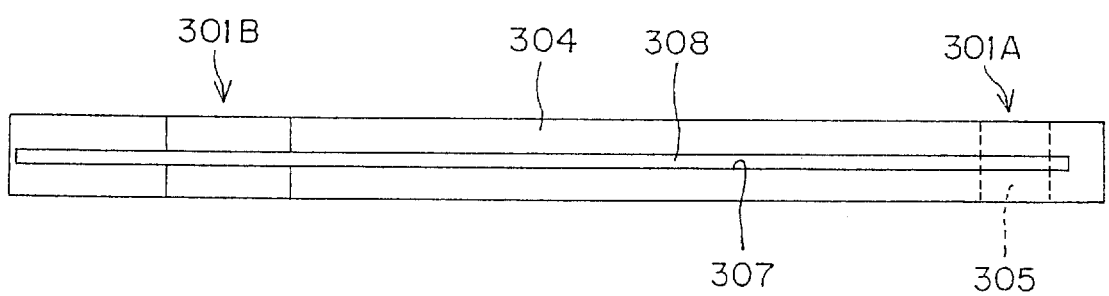
FIG. 9 is an elevational view of a surface of a guide body, as seen from the bottom of FIG. 8.

In the embodiment of the invention shown in FIGS. 6, 7(*a*) and 7(*b*), a plastic movable guide 200 is formed by inserting a reinforcing plate 208 into a guide body 201. The configuration of the guide is the same as that of the previously described embodiment, except that reinforcing ribs 203' on the plate-receiving portion 203 are formed so as to be perpendicular or nearly perpendicular to the shoe 202, and that punched holes 208B are formed in the reinforcing plate 208 to reduce the weight of the guide.

Because the reinforcing plate is recessed below the opening of the slot direct contact between the plunger of a tensioner and the reinforcing plate is avoided. Consequently, no metallic noise is produced in the operation of the guide. Moreover, the end of the plunger of the tensioner is engaged with a large area of the flange portion of the plastic guide body so that contact pressure on the guide body is reduced. This results in decreased wear in the reinforcing plate. Accordingly, hardening of the reinforcing plate by a process such as heat treatment is not required, and consequently the production cost of the guide can be reduced. Furthermore, since the reinforcing plate is not distorted by heat treatment or other preliminary processing, the ease with which the reinforcing plate can be fitted into the slot of the guide body in the assembly process is significantly enhanced. Additionally, noises which occur as the guide pivots in its operation are absorbed by the plastic guide body. The reduction of noise produced by the guide contributes to an overall reduction in the noise produced by the engine or other machine in which the guide is incorporated.

Because the guide body and the reinforcing plate are both pivotally mounted on a shaft extending through aligned mounting holes in both elements, they are held together by their engagement with the shaft, and can cooperate with each other without the reinforcing plate becoming disconnected from the guide body. Additionally, if there is a difference between the coefficients of the thermal expansion of the reinforcing plate and the guide body, the elements can expand and contract relative to each other in the longitudinal direction of the guide. Consequently, breakage of the guide due to thermally induced deformation does not occur, and its service life is significantly improved.

We claim:

1. In a power transmission comprising a flexible traveling power transmission medium, the combination of a tensioner plunger having a guide-engaging end surface, and a plastic movable guide comprising an elongated guide body composed of an elongated shoe having a front surface for sliding contact with the power transmission medium and a back side, and a plate-receiving portion extending longitudinally along the back side of said shoe and having a longitudinally extending slot having an opening facing in a direction opposite to the direction in which said front surface of the shoe faces, the shoe and plate-receiving portion being integrally molded as a unit from a synthetic resin, and a reinforcing plate fitting into said slot, the guide body and reinforcing plate being pivotable about a mounting located adjacent one end of the guide body, wherein a part of said plate-receiving portion remote from said one end of the guide body forms a plunger-engaging surface engaged with said end surface of said plunger, the plunger-engaging surface being divided by the opening of said slot, and said reinforcing plate being recessed in said slot, at least at the location at which the slot divides said plunger-engaging surface, so that said reinforcing plate does not protrude from the part of the opening of said slot dividing the plunger-engaging surface, whereby the plunger is prevented from direct contact with the reinforcing plate.

2. The combination according to claim 1, in which a mounting hole for mounting the guide is provided adjacent said one end of the guide body, and a through hole is provided adjacent an end of said reinforcing plate, said through holes being in register with each other, whereby the reinforcing plate and the guide body may be held together by, and pivoted on, a shaft extending through said mounting holes.

3. The combination according to claim 1, in which the amount by which said reinforcing plate is recessed in said slot, at the location at which the slot divides said plunger-engaging surface, is not more than the width of the slot, whereby said guide-engaging surface of the plunger is maintained at a distance not greater than the width of the slot from said reinforcing plate.

\* \* \* \* \*